Dec. 25, 1956  E. S. COX  2,775,400
TURBINE DRIVEN FAN UNIT
Filed Sept. 8, 1952  2 Sheets-Sheet 1

EUGENE S. COX,
INVENTOR.

BY

ATTORNEY

Dec. 25, 1956  E. S. COX  2,775,400
TURBINE DRIVEN FAN UNIT
Filed Sept. 8, 1952  2 Sheets-Sheet 2
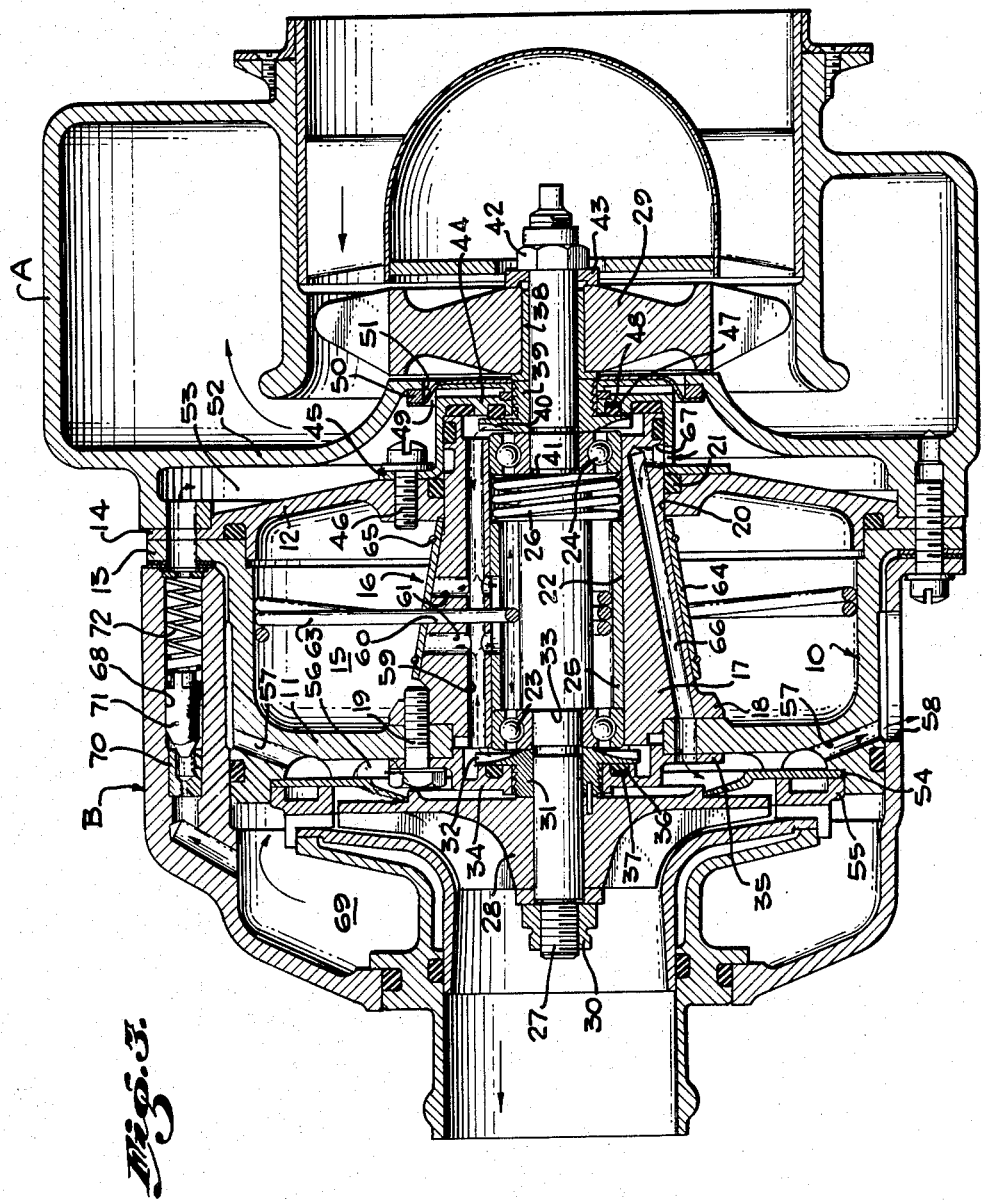
Fig. 3.
Eugene S. Cox,
INVENTOR.
BY 
ATTORNEY

United States Patent Office 2,775,400
Patented Dec. 25, 1956

2,775,400

TURBINE DRIVEN FAN UNIT

Eugene S. Cox, Palos Verdes Estates, Calif., assignor to The Garrett Corporation, Los Angeles, Calif., a corporation of California Application September 8, 1952, Serial No. 308,450

6 Claims. (Cl. 230—116)

The present invention relates generally to power driven devices, and is more particularly concerned with improvements in a turbine driven fan unit of the high velocity type, such as may be utilized for the air conditioning and refrigeration of enclosures, especially enclosures in aircraft.

It is one object of the herein described invention to provide improved means for lubricating and cooling the bearing structure of high speed air turbine driven fan units.

Another object resides in the provision of novel pressurized cooling for high speed air turbine driven devices, which is arranged to utilize the high pressure air for cooling purposes, such cooling to become effective when the unit speed reaches a predetermined speed of operation.

Still another object is to provide a forced cooling system which is pressure actuated and wherein the cooling is conducted to the bearing structure and passed through counterflow cooling passages.

Having the foregoing in mind, the invention briefly comprises a lubricant chamber which is substantially fully packed with an absorbent material, the lubricant being conducted to the bearing structure by means of suitable wicks. Cooling passages are provided in the bearing structure, and these passages are connected at one end with the exterior or ambient air surrounding the unit, whereas the inlet ends of the passages are connected with a flow passage from the turbine air inlet, this passage containing a poppet valve which is adjusted to open at predetermined pressure of turbine inlet air.

The invention, for example, has been applied to a fan unit, wherein the fan is driven by an air expansion cooling turbine. The turbine is of high pressure type and has an air flow of approximately 20 lbs./min. In this turbine unit, bearing cooling up to 67–70,000 R. P. M. is not required, and lubrication at these speeds is accomplished by the wick lubricating arrangement. As the pressure of turbine inlet air increases, the turbine speed also increases. At the higher pressures and speeds, however, pressurized cooling becomes mandatory and as the pressure of the turbine inlet air rises above approximately 55 to 60 p. s. i., bleed diversion of turbine inlet air may be accomplished for cooling purposes without seriously affecting turbine efficiency or cabin air flow, where the unit is being utilized in an air conditioning system, for example, of aircraft.

Further objects of the invention will be brought out in the following part of the specification, wherein detailed description is for the purpose of fully disclosing the invention without placing limitations thereon.

Referring to the accompanying drawings, which are for illustrative purposes:

Fig. 3 is a longitudinal section through the unit as viewed in the direction indicated by line 3—3 of Fig. 2.

Figure 1:
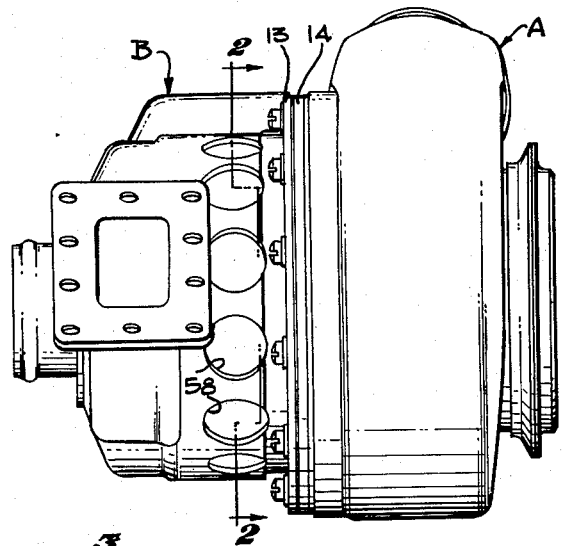
Fig. 1 is an elevational view of a turbine driven fan unit embodying the features of the present invention.

Referring now to the drawings, for illustrative purposes there is shown in Fig. 1 a fan unit constructed according to the present invention. As there shown, the unit comprises a multi-section casing consisting primarily of a fan casing section A and a turbine casing section B which are secured together in axial alignment to form a unitary assemblage.

As shown in Fig. 3, there is a hollow inner housing, as generally indicated by the numeral 10, this housing being formed by annular dished walls 11 and 12 which are interconnected by cooperatively associated rim flanges 13 and 14, and supported in position by clampingly engaging the flanges 13 and 14 between the interconnected ends of the fan casing section A and the turbine casing section B. The walls 11 and 12 cooperate to form an annular chamber 15 which surrounds a bearing structure assembly 16 which is axially supported from the walls 11 and 12.

The bearing structure assembly is constructed with a tubular bearing support 17 having a flange 18 at one end which is secured as by a plurality of mounting screws 19 to the wall 11.

With the bearing support mounted as described above, it will be noted that it projects axially through the chamber 15 and has its outer end positioned in and extending through a central opening 20 in the wall 12, a sealing ring 21 being interposed between the bearing support and the adjacent wall.

The bearing support 17 is of generally tapered construction from the flange 18 to its outer end and is provided with a longitudinally extending axial bore 22 within which there is positioned anti-friction bearing assemblies 23 and 24. The bearing assemblies are held in spaced relation by means of a tubular spacer 25, one end of this spacer being against the bearing assembly 23, and a bearing loading spring 26 being positioned between the other end of the tubular spacer and bearing assembly 24.

The bearing assemblies 23 and 24 cooperatively support a rotor structure consisting of a main shaft 27 having a turbine wheel 28 and a fan impeller 29 at its opposite ends, the turbine wheel being operatively positioned within the turbine casing section B and the fan impeller being operatively positioned within the fan casing section A.

As clearly shown in Fig. 3, the turbine wheel 28 is secured on the shaft by means of a securing nut 30 which forcibly retains the inner race of bearing assembly 23, the turbine wheel 28 and a hub portion 31 of a slinger or fan element 32 in assembled relation between a shaft shoulder 33 and the nut 30. This end of the bearing support 17 is sealed by means of an end seal 34 which is supported from the wall 11 by means of a circumferentially extending peripheral flange 35 which is also engaged by the securing screws 19 previously mentioned. The end seal 34 is arranged to make sealing engagement with the hub 31, and is also provided with a ring gasket 36 seated in a retaining groove 37, which bears against the adjacent fan element 32.

At the opposite end of the shaft, a similar mounting arrangement is utilized for the fan impeller which in this case is mounted on a hub sleeve 38 having an end which makes abutment with a hub portion 39 of a slinger or fan element 40. In this case, the inner race of bearing assembly 24, the hub portion 39 and the hub sleeve 38 are forced against a shaft shoulder 41 by means of a securing nut 42, a washer 43 being interposed between the nut and the impeller 29 assembly. This end of the bearing support 17 is also sealed by means of an end seal 44 having a circumferentially extending peripheral flange 45 which is secured by a plurality of mounting screws 46 to the wall 12. The end seal 44 has sealing engagement with the hub portion 39 and carries a ring gasket 47 which is seated in a groove 48 and bears against the slinger or fan element 40. The outer end of end seal 44 is seated in a cupped disc member 49, the periphery of which engages a gasket 50, surrounding an opening 51 formed in a septum annular wall 52 within the fan casing section A.

As clearly shown in Fig. 3, it will be observed that the wall 52 is spaced from the wall 12 and cooperates therewith to form an annular cavity 53 at this end of the housing 10. At the opposite end, the housing 10 has an annular seal member 54 which is secured in mounted position by a retaining shim 55 at its periphery and has its inner edge making sealing engagement with the turbine wheel 28. The seal member 54 in this case is supported in spaced relation to the wall 11 and cooperates therewith to form an annular cavity 56 at this end of the housing 10 which is in communication with the exterior or ambient air of the unit through connected passageways 57 and port openings 58.

Figure 2:
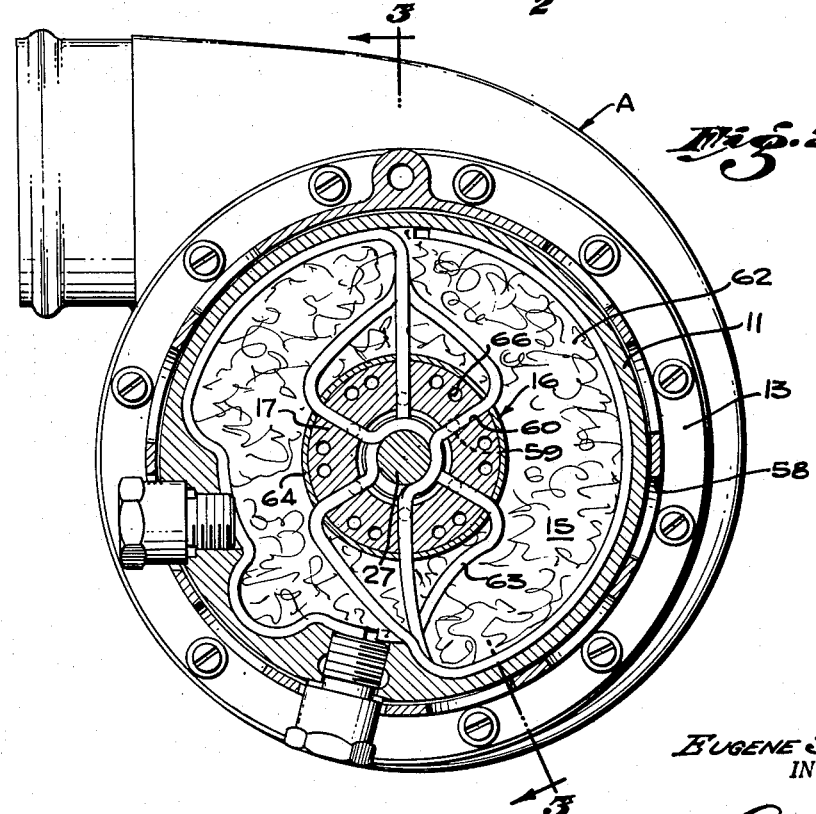
Fig. 2 is an enlarged transverse sectional view, taken substantially on line 2—2 of Fig. 1 to show details of the lubricant chamber.

The bearing support 17 is provided adjacent its axial bore 22 with a plurality of symmetrically circumferentially spaced longitudinally extending lubricant conducting passages 59 which are in communication at their ends with the fan elements 32 and 40 respectively, and intermediate their ends are in communication with a radially extending wick passage 60 and laterally positioned radially extending lubricant flow passages 61—61. It will be observed that these radial passages provide interconnections between the annular space within the tubular spacer 25 surrounding the adjacent shaft surface, and the lubricant chamber 15 which is packed with an absorbent material such as cotton, as indicated by the numeral 62 and shown in Fig. 2. Strands of wicking 63 are threaded through the wick passages 60 and so arranged that intermediate portions are partially carried around the shaft 27, and their outer portions carried through the packing 62 so as to provide means by which lubricant may be carried to the rotating shaft at a position between the bearings 23 and 24. The passages 61 form lubricant circulating passages, and at their outermost ends are covered with an overlying blanket element 64 of fibrous sheet or suitable fabric to form a cover or strainer which will prevent entry of foreign particles into the lubricant circulation system. This blanket extends longitudinally of substantially the entire surface of the bearing support which lies within the chamber 15, and is held in position by any suitable means, for example, such as by the use of binding wires 65.

In addition to the passages 59, the bearing support is further provided adjacent its outer surface with pairs of passages 66—66 for the circulation of a cooling medium, these passages being alternately circumferentially arranged with the passages 59. As shown in Fig. 3, the passages 66 communicate at one end through connection openings in the wall 11 and flange 35 with the annular cavity 56. At their other ends, the passages 66 communicate through port openings 67 with the annular cavity 53.

As will be noted in Fig. 3, the annular cavity 53 is connected through a series of interconnected passages, generally indicated by the numeral 68, with an inlet chamber 69 for the turbine operating fluid, in this case pressurized air.

The passage 68, between the cavity 53 and the inlet chamber 69, is provided with a valve seat 70 having a restricted flow passage therethrough, this seat being operatively associated with a valve member 71 which is biased to closed or seated position by means of an expansion spring 72. This valve structure forms a poppet valve subject to pressure within the inlet chamber 69, and the spring is so chosen that upon this pressure reaching a predetermined value, the valve 71 will be unseated so as to permit flow of turbine actuating fluid through the passages 68, the cavity 53, port openings 67, the passages 66 to the annular cavity 56, and hence through the passageways 57 and port openings 58 to the exterior of the casing of the unit.

Under ordinary operating conditions, auxiliary cooling of the bearing structure is not required, and at this time lubricant will be supplied to the shaft surface intermediate the bearing assemblies 23 and 24 by means of the wicking 63. The high speed of rotation of the shaft will act to throw the lubricant centrifugally outwardly and break it up into a fine mist which will be induced to flow in opposite directions through the bearing assemblies 23 and 24 due to the action of the slinger or fan elements 32 and 40 respectively. After the mist passes through the bearing assemblies 23 and 24, it is formed through the passages 59 to the flow passages 61 where it may again return to the shaft surface between the bearings, or be forced outwardly through the blanket 64 back into the lubricant chamber 15.

However, as the speed of the unit increases in response to increased inlet pressure, a point of operation is reached wherein the auxiliary cooling becomes necessary. The valve 71 is arranged to open at this point and permit the circulation of air from the turbine inlet chamber 69 through the bearing support so as to provide for the required additional cooling.

Various modifications might suggest themselves to those skilled in the art without departing from the spirit of my invention, and, hence, I do not wish to be restricted to the specific form shown or uses mentioned, except to the extent indicated in the appended claims.

I claim:

1. In a power driven fluid circulating unit: a casing including a turbine end section, a main fan end section and a chamber for lubricant; a bearing structure including spaced bearings and having a passage for circulation of a cooling fluid, said passage having an inlet, and outlet in communication with the casing exterior; means for lubricating said bearings; a rotor structure including a shaft rotatably mounted in said bearings, a fan carried by one end of said shaft and positioned in said fan end section, and a turbine wheel carried by the other end of said shaft; an inlet chamber contained in said turbine end section for supplying an actuating fluid to said wheel; a bleed connection between said inlet chamber and the inlet of said passage for conducting turbine actuating fluid to said passage for cooling the bearing structure independently of the lubricating means; a valve in said bleed connection actuated in an opening direction by pressure of fluid from said inlet chamber; and means biasing said valve to closed position, said biasing means being adjustable to enable valve opening at a predetermined pressure of actuating fluid in said inlet chamber.

2. In a power driven fluid circulating unit: a casing including a turbine end section, a main fan end section and a chamber for lubricant; a bearing structure including spaced bearings and having a passage for circulation of a cooling fluid, said passage having an inlet, and an outlet in communication with the casing exterior; means for lubricating said bearings; a rotor structure including a shaft rotatably mounted in said bearings, a fan carried by one end of said shaft and positioned in said fan end section, and a turbine wheel carried by the other end of said shaft; an inlet chamber contained in said turbine end section for supplying an actuating fluid to said wheel; a bleed connection between said inlet chamber and the inlet of said passage for conducting turbine actuating fluid to said passage for cooling the bearing structure independently of the lubricating means; and a poppet valve in said bleed connection for controlling flow therethrough from the inlet chamber.

3. In a power driven fluid circulating unit: a casing including a turbine end section, a main fan end section and a chamber for lubricant; a bearing structure including spaced bearings and having a passage for circulation of a cooling fluid, said passage having an inlet, and an outlet in communication with the casing exterior; means for lubricating said bearings; a rotor structure including a shaft rotatably mounted in said bearings, a fan carried by one end of said shaft and positioned in said fan end section, and a turbine wheel carried by the other end of said shaft; an inlet chamber contained in said turbine end section for supplying an actuating fluid to said wheel; a bleed connection between said inlet chamber and the inlet of said passage for conducting turbine actuating fluid to said passage for cooling the bearing structure independently of said lubricating means; and valve means for controlling flow through said bleed connection from said inlet chamber.

4. In a power driven fluid circulating unit: a casing including a turbine end section, a main fan end section and an intermediate chamber for lubricant; a bearing structure including spaced bearings and having a passage for circulation of a cooling fluid, said passage having an inlet and an outlet; means for lubricating said bearings; a rotor structure including a shaft rotatably mounted in said bearings, a fan carried by one end of said shaft and positioned in said fan end section, and a turbine wheel carried by the other end of said shaft; an inlet chamber contained in said turbine end section for applying an actuating fluid to said wheel; walls defining cavities at the opposite ends of said intermediate chamber respectively having communication with the inlet and outlet of said passage, the cavity adjacent said turbine end section being in communication with the exterior of said casing; a bleed connection between said inlet chamber and the other of said cavities; and a valve controlling flow through said bleed connection, said valve being responsive to inlet chamber pressure.

5. In a power driven fluid circulating unit: a casing including a turbine end section, a main fan end section and an intermediate chamber for lubricant; a bearing structure including spaced bearings and having a passage for circulation of a cooling fluid, said passage having an inlet and outlet; means for lubricating said bearings; a rotor structure including a shaft rotatably mounted in said bearings, a fan carried by one end of said shaft and positioned in said fan end section, and a turbine wheel carried by the other end of said shaft, an inlet chamber contained in said turbine end section for supplying an actuating fluid to said wheel; walls defining cavities at the opposite ends of said intermediate chamber respectively having communication with the inlet and outlet of said passage, the cavity adjacent said turbine end section being in communication with the exterior of said casing; a bleed connection between said inlet chamber and the other of said cavities; and a valve for controlling flow through said bleed connection.

6. In a power driven fluid circulating unit: a casing including a turbine end section, a main fan end section and an intermediate chamber for lubricant; a bearing structure positioned in said chamber and having a passage for circulation of a cooling fluid, said passage having an inlet and outlet; spaced bearings in said bearing structure; means for lubricating said bearings; a rotor structure including a shaft rotatably mounted in said bearings, a fan carried by one end of said shaft and positioned in said fan end section, and a turbine wheel carried by the other end of said shaft; an inlet chamber contained in said turbine end section for supplying an actuating fluid to said wheel; walls defining cavities at the opposite ends of said intermediate chamber respectively having communication with the inlet and outlet of said passage, one of said cavities being in communication with the exterior of said casing; a bleed connection between said inlet chamber and the other of said cavities; and a valve for variably controlling flow through said bleed connection in accordance with pressure changes in said inlet chamber.

References Cited in the file of this patent
UNITED STATES PATENTS

| | | |
|---|---|---|
| 1,260,548 | Kingsbury | Mar. 26, 1918 |
| 1,877,345 | Mattmann | Sept. 13, 1932 |
| 1,905,521 | Stiener | Apr. 25, 1933 |
| 2,452,046 | Garrison | Oct. 26, 1948 |
| 2,492,672 | Wood | Dec. 27, 1949 |
| 2,702,093 | Sherrill | Feb. 15, 1955 |